(12) United States Patent
El-Madhy et al.

(10) Patent No.: US 8,422,821 B2
(45) Date of Patent: Apr. 16, 2013

(54) SELECTIVELY TRANSFORMING A MULTI-DIMENSIONAL ARRAY

(75) Inventors: Ahmed El-Madhy, Alexandria (EG); Hisham El-Shishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/641,997

(22) Filed: Dec. 18, 2009

(65) Prior Publication Data
US 2010/0158408 A1  Jun. 24, 2010

(30) Foreign Application Priority Data
Dec. 19, 2008  (EP) .................................. 08172307

(51) Int. Cl.
*G06K 9/36* (2006.01)
*G06K 9/64* (2006.01)

(52) U.S. Cl.
USPC ............ 382/279; 382/276; 382/277; 382/282

(58) Field of Classification Search .................. 382/276, 382/277, 279, 280, 282
See application file for complete search history.

(56) References Cited

U.S. PATENT DOCUMENTS

| | | | | |
|---|---|---|---|---|
| 4,918,742 A | * | 4/1990 | Simonds | 382/304 |
| 7,979,672 B2 | * | 7/2011 | El-Mahdy et al. | 712/17 |
| 8,056,086 B2 | * | 11/2011 | El-Mahdy et al. | 718/105 |
| 8,160,388 B2 | * | 4/2012 | El-Mahdy et al. | 382/276 |
| 8,270,759 B2 | * | 9/2012 | El-Mahdy et al. | 382/276 |

OTHER PUBLICATIONS

Fialka et al. "FFT and convolution performance in image filtering on GPU", Proc. Int. Conf. Inf. Vis., 2006.*
FFT, Alan V. Oppenheim and Ronald W. Schafer, Digital Signal Processing, Prentice-Hall, Inc., 1975.
Bader, David A., et al, FFTC: Fastest Fourier Transform for the IBM Cell Broadband Engine, (pp. 172-184) HiPC 2007.

* cited by examiner

*Primary Examiner* — Li Liu
(74) *Attorney, Agent, or Firm* — Steven L. Nichols; Van Cott, Bagley, Cornwall & McCarthy P.C.

(57) ABSTRACT

A method for selectively transforming a multi-dimensional input array comprising D dimensions includes segmenting the input array into a number of sub-arrays with a computing system; determining a D-dimensional convolution of the input array at only selected points in each the sub-array, the convolution being a function of a product of D one-dimensional kernels; determining partial convolutions at each dimension iteratively, an iterative determination of one of the partial convolutions being determined, in part, from a previous iterative determination; collecting transformed sub-array values to form a transformed input array; and storing the transformed input array.

20 Claims, 11 Drawing Sheets

Fig. 9

SELECTIVELY TRANSFORMING A MULTI-DIMENSIONAL ARRAY

BACKGROUND

The present specification relates generally to multi-dimensional data processing applications and in particular to multi-dimensional convolution for multi-core processors.

Many newer multimedia applications employ multi-core processors. A multi-core processor is one in which more than one processing core is implemented on the same chip. Each processor core is capable of executing instructions independently. Multiple cores allow for parallel processing of instructions and thus are able to provide increased instruction throughput. The processing potential for multi-core processors may be reached through efficient parallel programming practices. As new processing technology arises, new programming methods may be needed to take advantage of new processing features.

Processors often perform operations on large sets of data. One commonly used operation is a convolution. Convolution operations are widely used in many applications including, but not limited to, image processing, pattern recognition, classification, signal processing, three-dimensional (3D) graphics, seismic imaging and other multimedia and scientific applications. These applications typically involve the use of the convolution operation on large multi-dimensional arrays. Operations over the entire multi-dimensional array may be quite processor intensive. In some cases, convolution operations are only needed at certain points within the array and not others. Thus, processing resources may be wasted by performing the convolution operation over the entire multi-dimensional array.

BRIEF SUMMARY

A method for selectively transforming a multi-dimensional input array comprising D dimensions includes segmenting the input array into a number of sub-arrays with a computing system; determining a D-dimensional convolution of the input array at only selected points in each the sub-array, the convolution being a function of a product of D one-dimensional kernels; determining partial convolutions at each dimension iteratively, an iterative determination of one of the partial convolutions being determined, in part, from a previous iterative determination; collecting transformed sub-array values to form a transformed input array; and storing the transformed input array.

A computing system for selectively transforming a multi-dimensional input array comprising D dimensions includes a memory and a processor, the processor comprising a cache. The processor is configured to segment the input array into a number of sub-arrays with a computing system; determine a D-dimensional convolution of the input array at only selected points in each the sub-array, the convolution being a function of a product of D one-dimensional kernels; determine partial convolutions at each dimension iteratively, an iterative determination of one of the partial convolutions being determined, in part, from a previous iterative determination; collect transformed sub-array values to form a transformed input array; and store the transformed input array.

A computer program product for selectively transforming a multi-dimensional input array comprising D dimensions includes a computer readable storage medium having computer readable code embodied therewith. The computer readable program code includes computer readable program code configured to segment the input array into a number of sub-arrays with a computing system; computer readable program code configured to determine a D-dimensional convolution of the input array at only selected points in each the sub-array, the convolution being a function of a product of D one-dimensional kernels; computer readable program code configured to determine partial convolutions at each dimension iteratively, an iterative determination of one of the partial convolutions being determined, in part, from a previous iterative determination; computer readable program code configured to collect transformed sub-array values to form a transformed input array; and computer readable program code configured to store the transformed input array.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 9 is an exemplary diagram illustrating partial convolution steps, in the example of FIG. 8.

Throughout the drawings, identical reference numbers designate similar, but not necessarily identical, elements.

Figure 1:
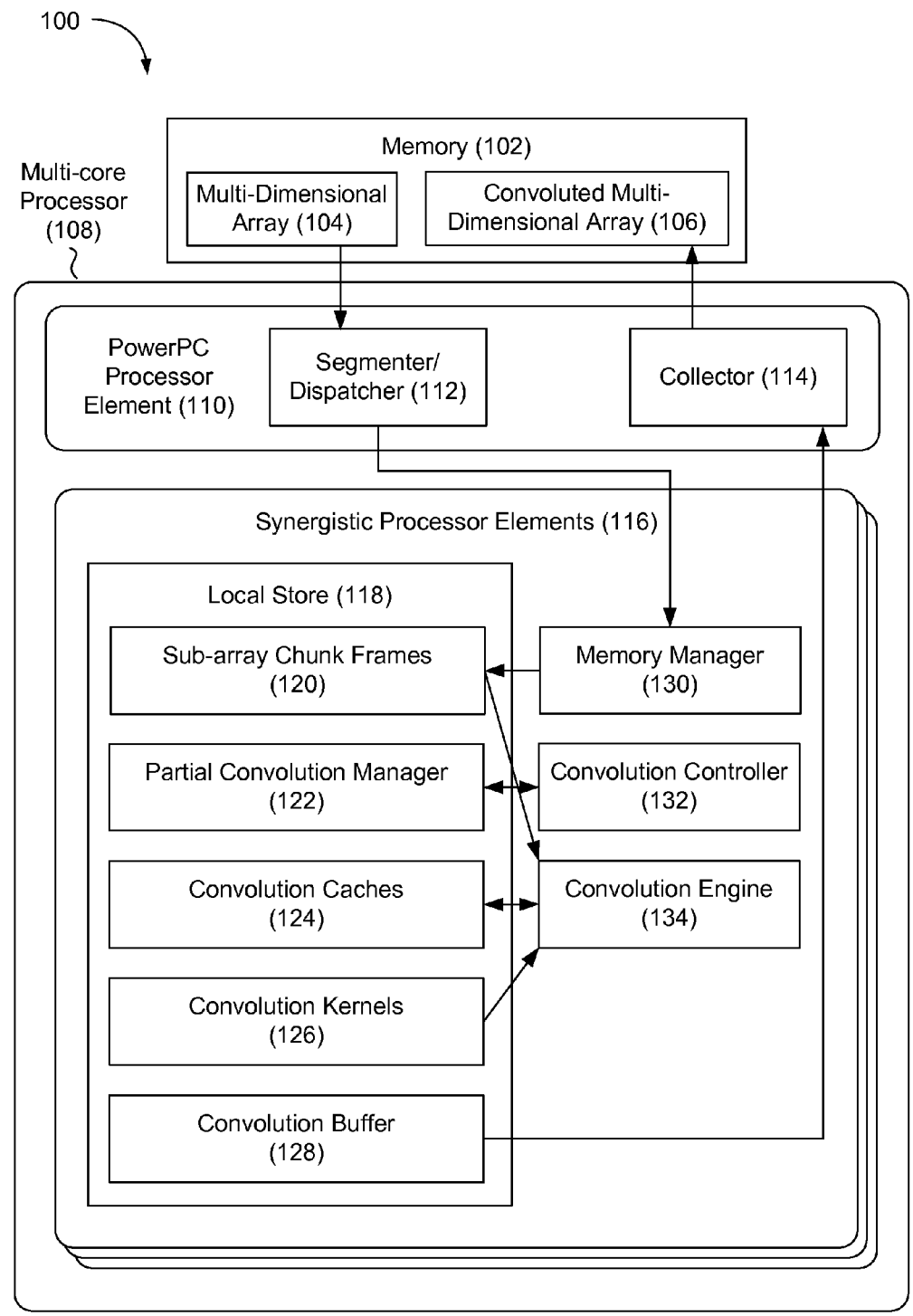
FIG. 1 is a system block diagram for generating a convoluted array, according to one illustrative embodiment of principles described herein.

Additionally, the detailed description is supplemented with Exhibits E1 to E5 containing examples of equations used in accordance with the embodiments of the invention. In the foregoing description, references to Exhibit Ei may be made directly using the Exhibit identifier "Ei". Exhibits E1 to E5 are placed apart for the purpose of clarifying the detailed description, and of enabling easier reference.

DETAILED DESCRIPTION

The present specification describes methods and system for performing selective convolutions on a multi-dimensional input array. According to certain illustrative embodiments, a D-dimensional input array may be segmented into a number of sub-arrays. Each sub-array may be transformed by determining a D-dimensional convolution of the input array at only selected points of each sub-array. The convolution operation may be divided up into partial convolutions with each iteration of a partial convolution may be based, in part, on past computed convolution values stored in a system cache. The transformed sub-array values may then be collected and stored in main memory.

The specification describes, among other things, convolution caches to exploit spatial locality at successive steps corresponding to convolution dimension degree, with negligible overheads. The caches allow reuse of previously computed convolution values, thereby increasing performance and decreasing power consumption. Thus, the processes described herein are well suited for embedded processors. The techniques described herein are particularly suitable for implementation in a multi-core processor, where each processor independently convolutes a segment of the input array. The convolution operation is a highly data-parallel operation which makes it amenable to vectorization.

The techniques described herein also provide a memory management scheme that is applicable to multi-core processors that rely on software memory management. Further advantages of the present invention will become clear to the skilled person upon examination of the drawings and detailed description. It is intended that any auxiliary advantages be incorporated herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram showing an illustrative system for generating a convoluted array. According to certain illustrative embodiments, a memory (102) may store a multi-dimensional input array (104) and a convoluted multi-dimensional array (106). A microprocessor (108) may include a Power PC Processor Element (100) including a segmenter/dispatcher (112) and a collector (114). The microprocessor may also include a number of synergistic processor elements (116), each element including a local processor store (118), a memory manager (130), a convolution controller (132) and a convolution engine (134). The local processor store (118) may have sub-array chunk frames (120), a partial convolution manager, (122), convolution caches (124), convolution kernels (126), and a convolution buffer (128) stored thereon.

The multi-dimensional array (104) may be an input array in which convolutions are computed with spatial selectivity. For example, the multi-dimensional array (104) may be a 3 dimensional array of numbers. The multi-dimensional array may also be an D-dimensional array having D dimensions with values $a_1, a_2, \ldots a_D$ for the corresponding dimensions. For any access beyond the dimension sizes, the array may return a value of zero.

Given a D-dimensional input array and an D-dimensional kernel, a D-dimensional convolution at a given point may be defined by the conventional equation (1) of Exhibit E1. In equation (1) of Exhibit E1, f denotes the input array and k denotes the kernel array. Further, $n_i$ denotes the number of possible values that coordinate i in the multi-dimensional array k can take. The input array f and kernel k are all indexed starting at one. Here, the function ceiling($n_i/2$) designates the smallest integer greater than or equal to $n_i/2$.

A kernel array may be an array of values which are a discrete representation of a mathematical function. Particular mathematical functions may be useful for performing desired operations on a multi-dimensional array (104). A convolution operation essentially computes the amount of overlap between the operands. In one exemplary application, a D-dimensional convolution may be performed on a D-dimensional array f and a kernel array k. The D-dimensional array may be an input data volume and the kernel array may be a Gaussian kernel. The convolution at a given point computes a weighted average of data points in the input array centered on the given point.

As mentioned above, a convolution may be determined efficiently and selectively at certain points using multi-core processors. The word "selectively" is used in the present description to indicate that applications might not necessarily need to compute convolution values at all points of the input array, but may require convolution values only at selected points. The selected points may be determined in any manner, such as from user input, default selected points, points outputted by a computer code, etc. For example, an application may be only concerned with computing convolutions on certain irregular three dimensional regions in three dimensional data volumes. Selectivity may be beneficial when memory is limited as is the case with typical embedded multi-core processors. Such selective processing may reduce memory requirements for the convolution process.

The kernel k may be defined as being separable if the kernel can be written as the product of D one-dimensional kernels according to equation (2) of Exhibit E1. If the kernel k is separable, then computing the convolution may be reduced to the simplified equation (3) of Exhibit E1.

Directly computing a convolution according to equation (3) of Exhibit E1 may be performed relatively fast with small kernel sizes. However, a large amount of memory may be required if the input array is relatively large. Moreover, when combined with the "selective" convolution requirement, many of the used memory may be wasted.

Another existing solution to compute multi-dimensional convolution is to compute Fast Fourier Transform (FFT) for the multi-dimensional array, perform point-to-point multiplication, and then perform inverse FFT transform on the array ((Alan V. Oppenheim and Ronald W. Schafer, Digital Signal Processing, Prentice-Hall, Inc., 1975.). This solution is faster than the previous one (for large convolution kernels) and may be parallelized in multi-core processors (David A. Bader and Virat Agarwal, FFTC: Fastest Fourier Transform for the IBM Cell Broadband Engine, HiPC 2007.). However, this technique requires a large amount of memory, amounting to the size of the input array. Further, selective convolution does not save memory and, for smaller kernels, padding with zeros is required to match the kernel with array sizes, making it less efficient for small kernel sizes.

The above prior art solutions for computing multi-dimensional convolutions further incur an increasing amount of temporary storage as the number of dimensions increases. This increase may be even more emphasized when convoluting at selective points. Accordingly, existing methods are not efficient when running on embedded multi-core processors.

Referring back to FIG. 1, the invention provides a system (100) for performing selective multi-dimensional convolutions that are suitable for use in a multi-core processor (108). In one embodiment, the multi-core processor (108) is deployed on the Cell BE microprocessor (IBM, Cell Broadband Engine Architecture, October 2006, Version 1.01.), which is a low-power, heterogeneous multi-core design. The Cell BE has one PowerPC processor element (PPE) (110) and 8 Synergistic Processing Elements (SPE) (116). Each SPE (116) has a local processor store (118) which is software managed and optimized for stream processing. The PPE (110) may include a Segmentor/Dispatcher C2 for dividing the multi-dimensional input array (104) into sub-arrays and for dispatching each sub-array into an SPE.

The memory manager (130) within each SPE (116) may be responsible for dividing the input array (104) in manageable chunks of data for processing by the SPE (116). The chunks may be stored in sub-array chunk frames (120). Sub-array chunk frames (120) may include four input sub-array buffers. Three buffers may be used for holding the sub-arrays, and the fourth buffer may be filled by the memory manager (130) which manages the filling of the sub-array buffers in a circular fashion.

The convolution controller (132) is responsible for controlling the operation among a convolution engine (134), a convolution cache (124), convolution kernels (126), convolution buffers (128), and a partial convolution manager (122).

The convolution engine (134) is provided to perform partial convolutions $p_i$, where i indexes each dimension from 1 to D, with the one-dimensional convolution kernel array $k_i+1$. The partial convolution manager (122) may be used to keep track of the current partial convolution step being performed.

The convolution cache (124) may include a data array for storing computed partial convolution values and a tag array that holds the tags of the data array entries. A tag is used by cache systems to indicate the location in memory where the cached value is stored. A cache may be provided for each partial convolution step. The cache allows reuse of previously computed convolution values, thereby increasing performance.

The convolution kernels (126) are a D-sized set of one-dimensional convolution kernels. The convolution buffers (128) are the generated convolution values which are communicated back to main memory via the collector (114) associated with the PPE (110). The collector (114) collects the convolution values from the SPEs (116) and stores the result as a convoluted multi-dimensional array (106) in main memory (102).

Figure 2:
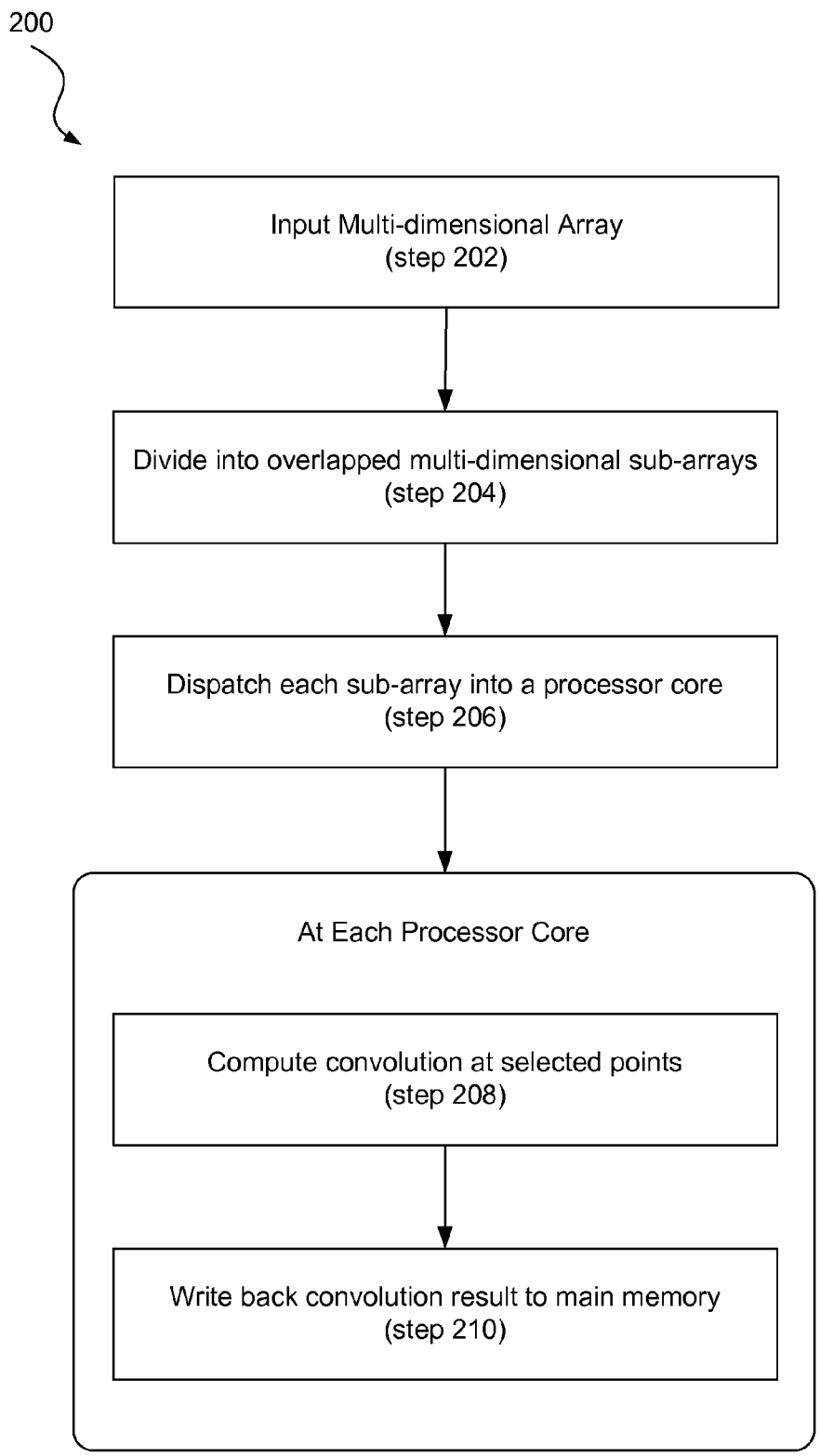
FIG. 2 is a flow chart for generating a convoluted array, according to one illustrative embodiment of principles described herein.

FIG. 2 is a flow chart showing an illustrative process (200) for generating a convoluted array from an input array. According to certain illustrative embodiments, the process (200) may begin with inputting (step 202) a multi-dimensional array into main memory.

The input array may then be divided (step 204) into a plurality of sub-arrays. Each sub-array may consist of manageable chunks of data. In some embodiments, the input array may be divided into substantially equal sub-arrays across the array's last dimension. The number of divisions may be equal to the number of processor cores in the system and overlapped with a region of thickness of $(n_{D-1})$, where $n_D$ represents the size of kernel $k_D$. For example, a possible division for an input array of dimension 4, where each dimension is of size 8, and each kernel is of size 3 could be as follows: processor 1 may process the sub-array of the original array points of (1 . . . 8, 1 . . . 8, 1 . . . 8, 1 . . . 2); processor 2 may process the sub-array of the original array points of (1 . . . 8, 1 . . . 8, 1 . . . 8, 1 . . . 3); processor 3 may process the sub-array of the original array points of (1 . . . 8, 1 . . . 8, 1 . . . 8, 2 . . . 4); processor 4 may process the sub-array of the original array points of (1 . . . 8, 1 . . . 8, 1 . . . 8, 3 . . . 5), and so on for the processors 5-7; and finally, processor 8 may process the sub-array of the original array points of (1 . . . 8, 1 . . . 8, 1 . . . 8, 7 . . . 8).

Further, each processor SPE is arranged to compute only one value for the last coordinate. For example, processor 1 may compute convolution among points (1 . . . 8, 1 . . . 8, 1 . . . 8, 1); processor 2 may compute convolution among points (1 . . . 8, 1 . . . 8, 1 . . . 8, 2); processor 3 may compute convolution among points (1 . . . 8, 1 . . . 8, 1 . . . 8, 3), and so on for the next SPEs 4 to 7; and finally, processor 8 may compute convolution among points (1 . . . 8, 1 . . . 8, 1 . . . 8, 8).

After the input array has been divided, each division may be dispatched (step 206) to a processor core. This may initiate loading chunks of the input array into sub-array chunk frames in the local processor cache. The loading operation may be tightly coupled with the convolution operation.

At each processor core, the convolution of the input array at selected points may be computed (step 208) within the appropriate sub-array. The convolution result may then be written (step 210) back to main memory. In some embodiments, this may be done using convolution buffers as described above in association with FIG. 1.

Figure 3:
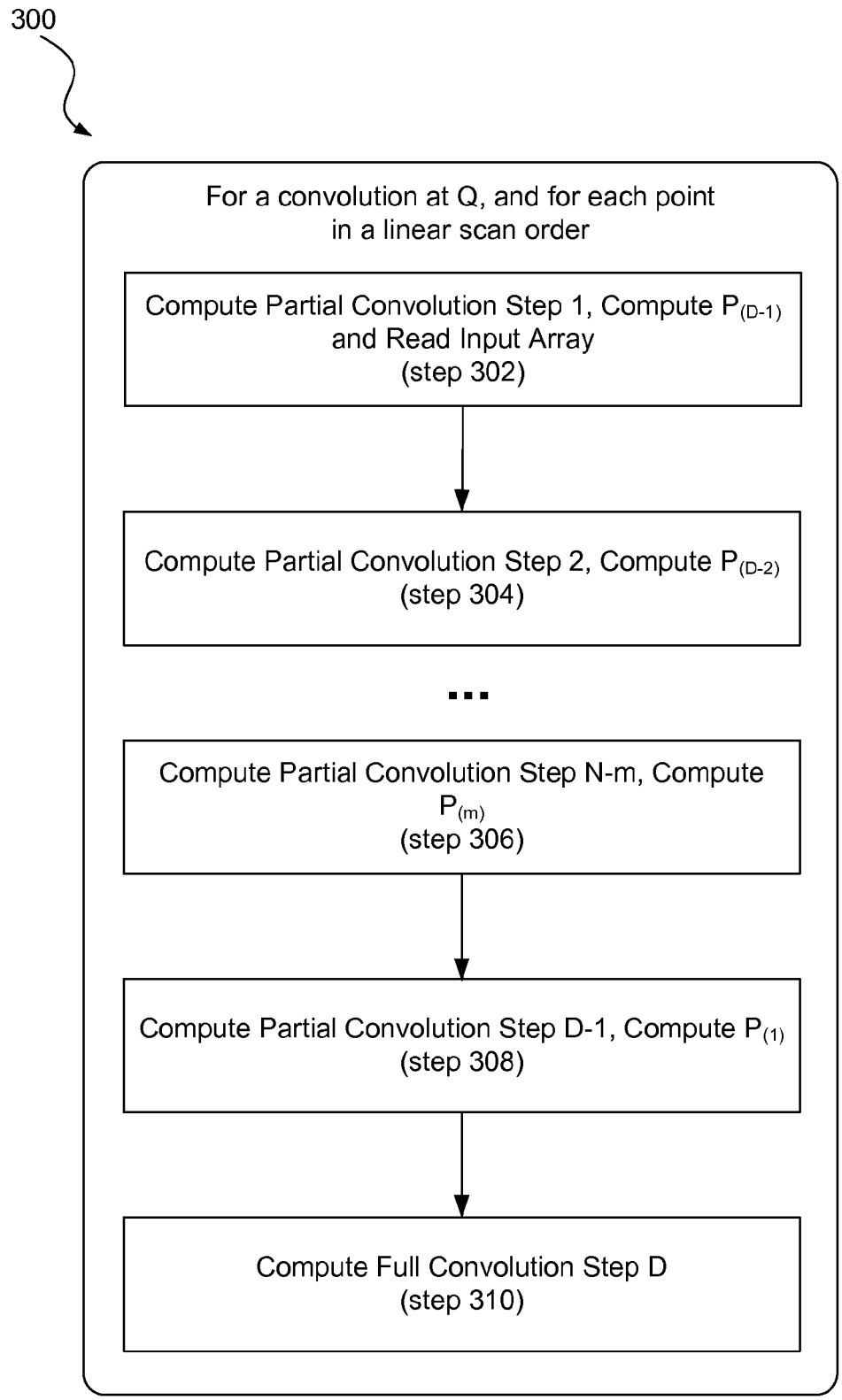
FIG. 3 is a flow chart illustrating the convolution operation performed for each sub-array of the input array, according to one illustrative embodiment of principles described herein.

FIG. 3 is a flow chart showing an illustrative process (300) describing in greater detail, the step of computing a D-dimensional convolution. According to certain illustrative embodiments, the process of computing a convolution comprises a series of sub-steps, each of which decrease the dimensions of the convolution space by 1. The flowchart of FIG. 3 involves the separable convolution equations of Exhibit E2. In Exhibit E2:

D represents the number of dimensions of the input array;

$p_i$ designates the partial convolution at dimension i where i varies from 1 to D;

$(u_1, u_2 \ldots u_D)$ designates the point at which a current convolution is performed; and $(j_1, j_2, \ldots j_D)$ represents an arbitrary point coordinates in the input array space.

To compute the convolution, each processor core iterates over all possible locations of the input array in a linear order, excluding half the size of overlapped regions with other processors. In particular, if the sub-array is a middle one, the first upper ceiling $(n_d/2)-1$ and bottom floor $(n_d/2)$ may skipped. The function floor$(n_d/2)$ designates the largest integer less than or equal to $n_d/2$, and the function ceiling$(n_d/2)$ designates the smallest integer greater than or equal to $n_d/2$. However, for the boundary sub-arrays that include the first and last sub-arrays, the top region is not skipped if the sub-array is the top sub-array, and the bottom region is not skipped if the sub-array is the bottom sub-array. Throughout this specification and in the appended claims, the expression "linear scan order" is used to designate the order according to which the entries of the input array are stored in a 1D space. For example, for a point $Q(u_1, u_2, \ldots, u_D)$ that is inside the input array, its linear position would be: $u_1+(u_2-1)*a_1+(u_3-1)*a_1*a_2+ \ldots +(u_D-1)*a_1*a_2* \ldots *a_{D-1}$, where $a_i$ is the size of dimension i $(0<=i<=n)$.

Accordingly, this order may correspond to the way the input array is stored into main memory (input array storage layout). Entries (or points) will be visited in an increasing number of entries positions.

Since convolution is performed selectively, there is a need to determine if the convolution at the current point is desired. If the current point is not desired, then the next neighboring point may be processed. The following convolution steps are carried out when convolution is desired. The current point will be referred hereinafter as $Q(u_1, u_2, \ldots, u_D)$. Such selection is driven by the underlying application. For example, an application may decide whether or not to operate on a current point depending on the value of the point coordinate.

The system computes (step 302) the partial convolution $P_{(D-1)}$ according to equation (1) of Exhibit E2. In equation (1), $j_i$ varies from $u_i$-ceiling$(n_i/2)+1$ to $u_i$-ceiling$(n_i/2)+n_i$, where i varies from 1 to D-1, and $n_i$ represents the size of the one dimension kernel $k_i$. In other words, the partial convolution $P_{(D-1)}$ is computed for all points $j_1, j_2, j_{(D-1)}, u_D$ where:

$j_1$ varies from $u_1$-ceiling$(n_1/2)+1$ to $u_1$-ceiling$(n_1/2)+n_1$, $j_2$ varies from $u_2$-ceiling$(n_2/2)+1$ to $u_2$-ceiling$(n_2/2)+n_2$, etc.

$j_{(D-1)}$ varies from $u_{(D-1)}$-ceiling$(n_{(D-1)}/2)+1$ to $u_{(D-1)}$-ceiling $(n_{(D-1)}/2)+n_{(D-1)}$.

The system may then compute (step 304) the partial convolution $P_{D-2}$ according to equation (2) of Exhibit E2.1. In equation (2) of Exhibit E2.1, $j_i$ varies from $u_i$-ceiling$(n_i/2)+1$ to $u_i$-ceiling$(n_i/2)+n_i$, where i varies from 1 to D-2, and $n_i$ represents the length of the one dimension kernel $k_i$. Step 304 is similar to step 302. One difference is the equation used to compute the partial convolution. Furthermore, step 304 does not involve reading the input array; rather the convolution cache is read.

The following steps (step 306) of FIG. 3 are all similar to the previously described steps. At each of the following steps, the partial convolution $P_{D-m}$ is computed as in step 306 for m varying from 3 to D-2, according to equation (m) of Exhibit E2.1. In equation (m) of Exhibit E2.1, $j_p$ varies from up-ceiling$(n_p/2)+1$ to up-ceiling$(n_p/2)+n_p$, where p varies from 1 to D-m.

The cache associated to each partial convolution may be a one dimensional array of convolution values which are indexed by the linear position of the current partial convolution point and a one dimensional array of tags. The length of each value is given by Exhibit E3 where H is set to D-m.

Partial convolution values are only computed if the value is not in the corresponding cache. Computing convolution would require reading from the cache of the previous step as the index of the $P_{D-m}+1$ partial convolution cache.

The last partial convolution P1 may then computed (step 308) similarly according to equation (D) of Exhibit E2.1. Finally, the convolution may be computed (step 310) according to Exhibit E2.2 using partial convolution P1 and one dimensional kernel k1. The cache may not be associated with this step.

Figure 4:
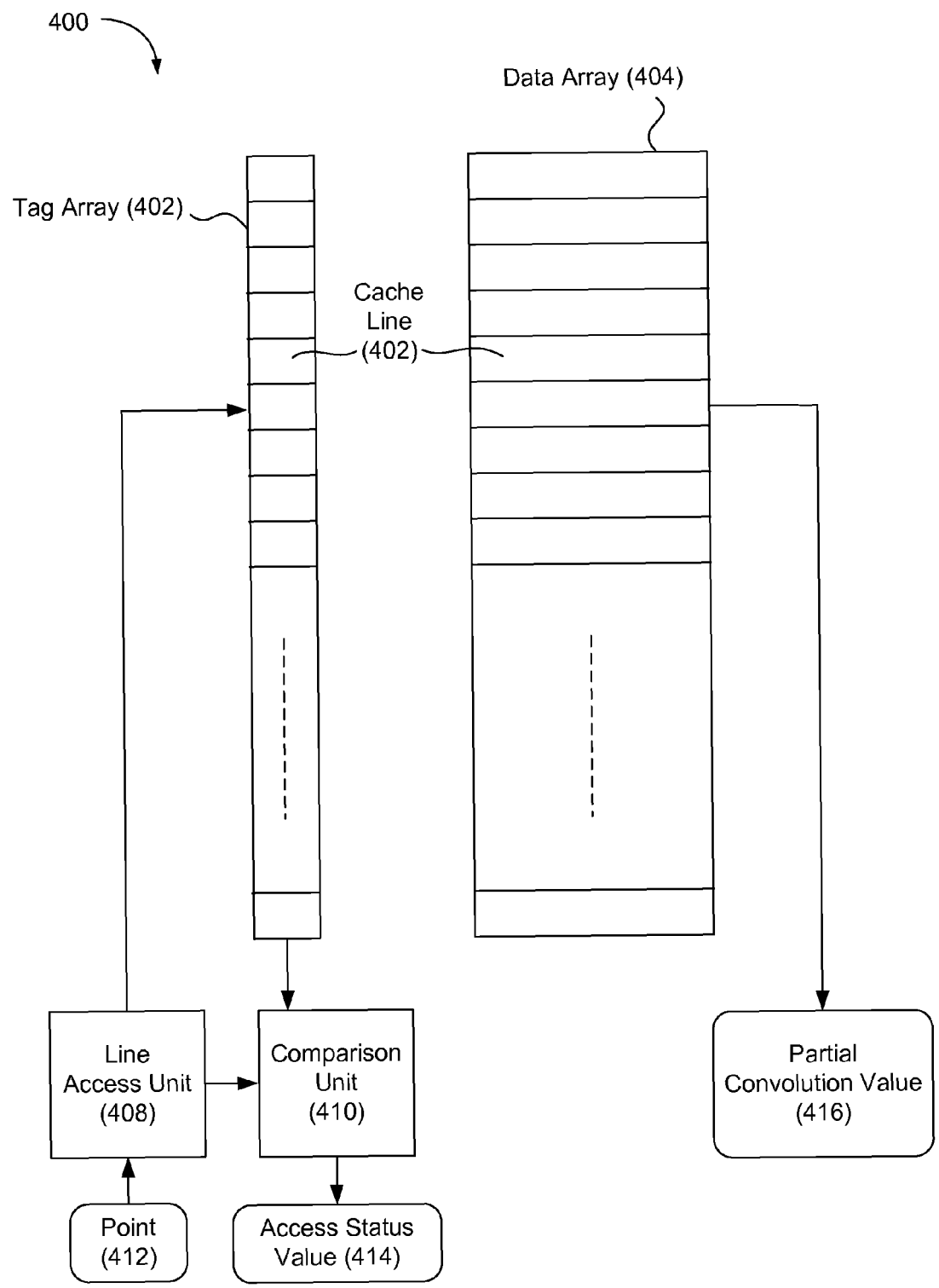
FIG. 4 is a system block diagram depicting the convolution cache structure, according to one illustrative embodiment of principles described herein.

FIG. 4 is a diagram showing an illustrative structure of the partial convolution cache. According to certain embodiments, the structure (400) may include a tag array (402), a data array (404), a line access unit (408), and a comparison unit (410). The tag array (402) may be initialized with values other than numeral values. The data array (404) may be used for storing partial convolution values (416). Both the tag array 9402) and the data array (404) may have a length according to Exhibit E3, where H is set to (D—Current Convolution Step).

The cache is indexed with the linear position of the point where the partial convolution is sought. A cache line may include a tag and a data value from the tag array and the data array respectively. The linear position of the point being sought ($x_1, x_2, \ldots, x_n$) modulo the cache length is used to determine a cache line (402). The line access unit (408) and the comparison unit (410) may be used to access and compare the current tag value to the linear position of the point (412). If the linear position of the point and the tag value are equal, the cache is said to have a "hit" status (414) and the corresponding data value may be read from the cache. If they are not equal, the cache is said to have a "missed" status (414), and no data value is returned.

Figure 5:
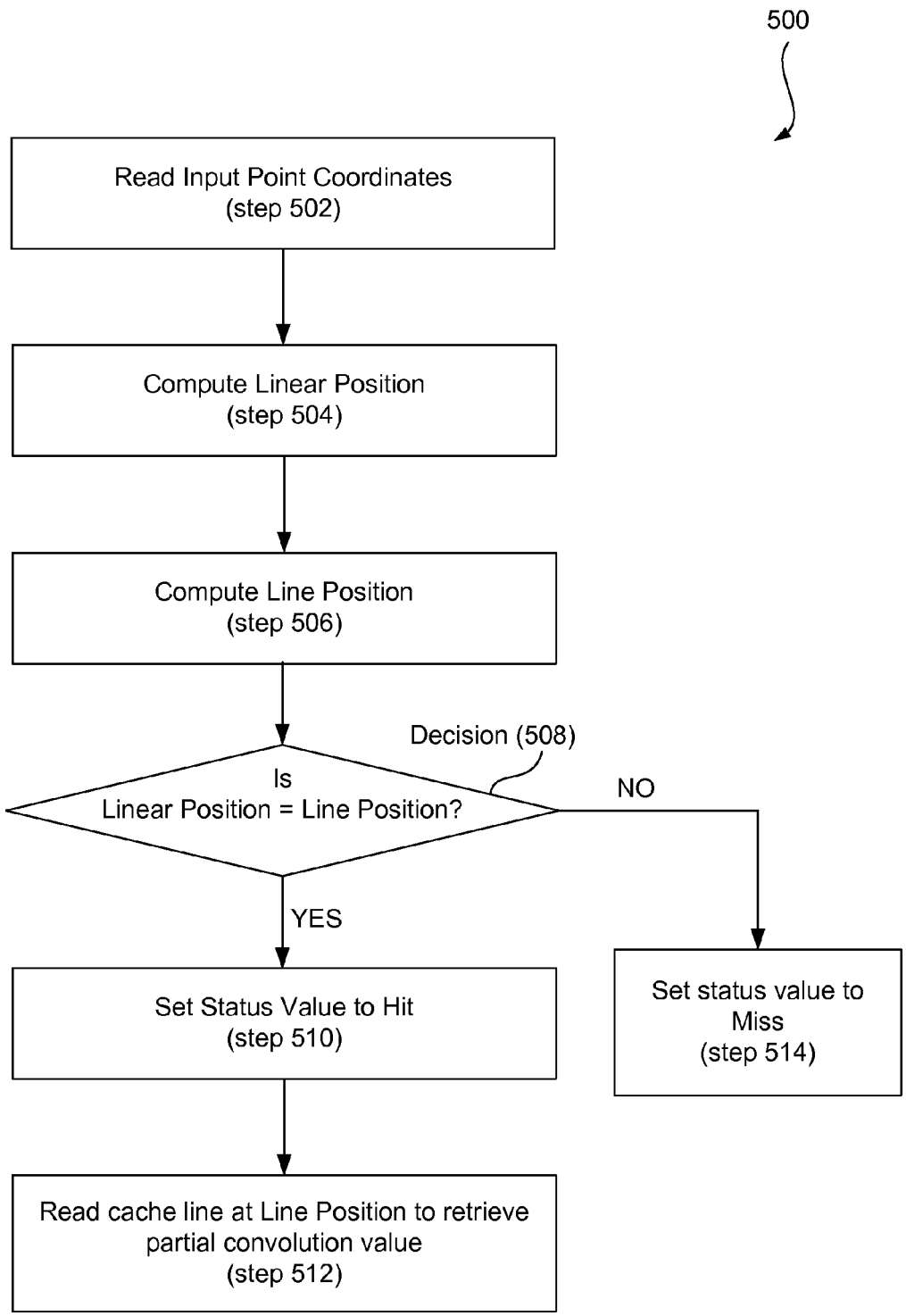
FIG. 5 is a flow chart describing the steps performed to retrieve pre-computed partial convolution values from the convolution cache for a particular point, according to one illustrative embodiment of principles described herein.

FIG. 5 is a flowchart showing an illustrative process (500) of determining a partial convolution value from the cache. According to certain embodiments, the process may begin my reading (step 502) input coordinates. For example, the point ($x_1, x_2, \ldots, x_n$) may be read. The coordinates of the read point may then be used to computer (step 504) a linear position. The computed linear position may then be stored as Linear_Pos. The linear position value may then be used to compute (step 506) a line position which may be stored as Line_Pos.

The system may then determine (decision 508) if the Line_Pos parameter and the Linear_Pos value are equal. If it is determined (NO, decision 508) that Linear_Pos is not equal to Line_Pos, then the cache access status may be set (step 514) to "miss." If it is determined (Yes, decision 508) that Linear_Pos is indeed equal to Line_Pos, then the cache access status may be set (step 510) to "hit." If the cache access status is set to hit, then the system may read (step 512) the cache line from the line position designated by Line_Pos and retrieve the value stored therein. If the cache has a "hit" access status value, there is no need to recompute partial convolution at that point. A next point may then be selected. If the cache has a "miss" access status value, the partial convolution is computed by the convolution engine as described above in accordance with FIG. 3. The computed value may then be stored at the identified cache line. The corresponding tag is then updated to be equal to the current linear address Linear_Pos of point Q.

Figure 6:
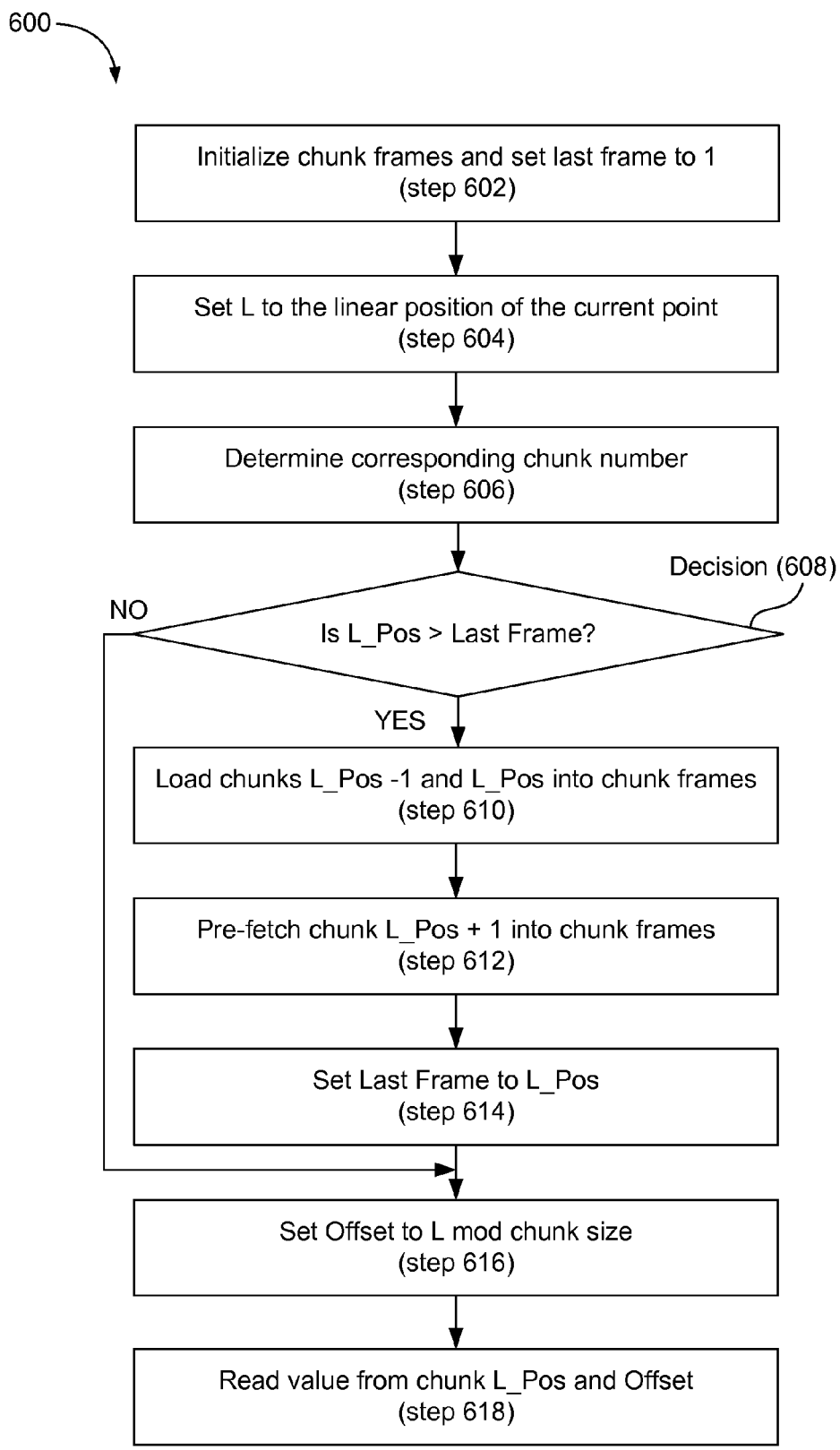
FIG. 6 is a flow chart describing the steps performed to access the input array for computation of a partial convolution value, according to one illustrative embodiment of principles described herein.

In order to compute the partial convolution according to Exhibit E2, access to the input array is needed. Such access requires reading in chunks from the main memory into local storage. FIG. 6 is a flow chart showing an illustrative process (600) for performing the steps necessary to access an input array. According to certain illustrative embodiments, the process may begin by initializing (step 602) chunk frames and setting the last chunk frame to 1. The system may include three chunk frame buffers each having a size Chunk_Size according to Exhibit E3 where H is set to D (number of dimensions of the input array).

The input array may be divided into substantially equal chunks of data, each having a size chunk_size, according to Exhibit E3 where H is set to D (number of dimensions of the input array). The chunks may be labeled linearly, such that the first chunk is labeled as "0" and the next chunk is labeled as "1," etc. Then, chunk frames may be allocated in the local processor store, each of size Chunk_Size according to Exhibit E3 where H is set to D (number of dimensions of the input array). In the exemplary embodiment of a CELL BE processor three chunks are allocated: initially chunks 0, 1 are loaded into chunk frames 0, 1; then a parameter Last_Frame is set to 1 and the fetching of chunk 3 into frame 3 is initiated.

The system may then set (step 604) a parameter L to the linear position of the current point. The corresponding chunk number may then be determined (step 606). The current point Q may be converted into a linear position L_POS according to Exhibit E4. L_POS is set to the chunk number where L resides. The value of L_POS may then be compared (decision 608) to the last frame. If it is determined (YES, decision 608) the L_POS parameter is substantially superior to Last_Frame, then the chunks at L_POS−1 and L_POS are loaded (step 610) into frames (L_POS−1 mod 3) and (L_POS mod 3). The system may then pre-fetch (step 612) the values at L_POS+1 into chunk frame (L_POS+1). The Last_Frame parameter may then be set (step 614) to L_POS. An offset value may then be set (step 616) to (L mod Chunk_Size). The frame number (Last_Frame mod 3) may then be selected and the offset point value OFFSET is read (step 618). If it is determined (NO, decision 608) that the L_POS parameter is not substantially superior to Last_Frame, then the process (600) may proceed to step 616.

Figure 7:
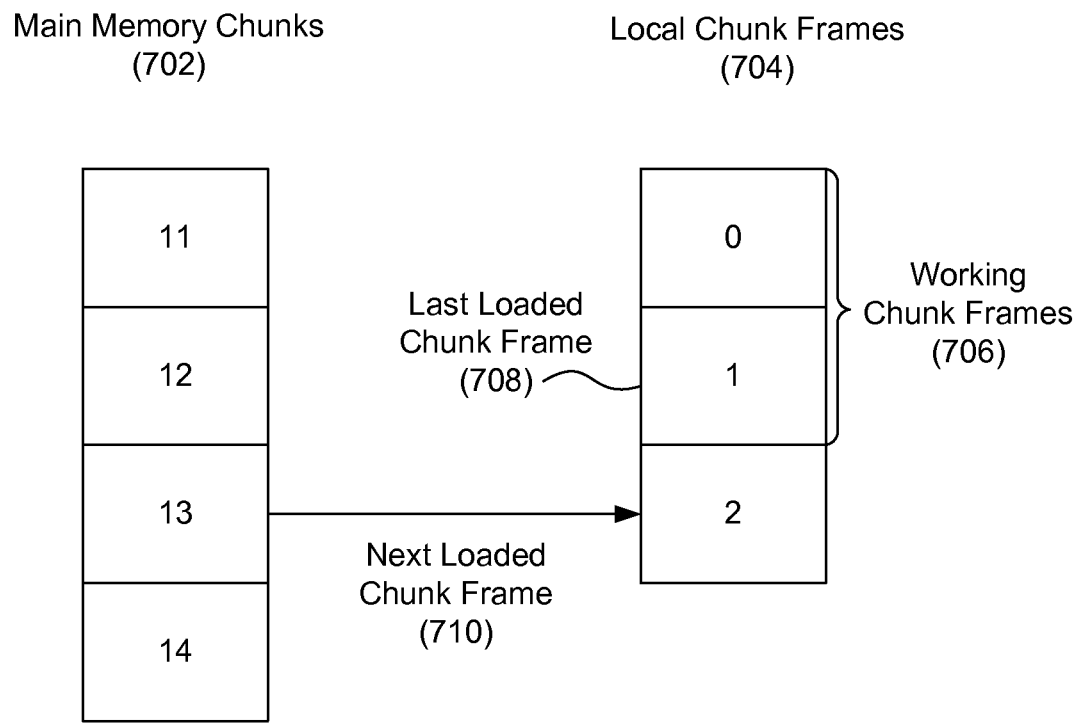
FIG. 7 is a simplified system bloc diagram depicting the access to the input array into local memory, according to one illustrative embodiment of principles described herein.

FIG. 7 is a diagram illustrating the steps performed for reading the input array into a local processor storage. According to certain illustrative embodiments, the local processor storage may include local chunk frames (704) which receive chunk frames from main memory (702). The local chunk frames (704) may include two working chunk frames (706), including the last loaded chunk frame (708). A next chunk frame (710) may be pre-fetched. The chunk frames in local storage may be organized as a circular list. When a chunk is accessed that is larger than Last_Frame parameter by one, the Last_Frame pointer is adjusted to point to the pre-fetched chunk, and the oldest chunk frame is then pre-fetched. For the general case when the new access is larger than Last_Frame (by more than one), up to two frames are fetched, in addition to the third frame being pre-fetched.

Methods and systems embodying principles described within this specification may allow efficient transformation of a multi-dimensional input array into a multi-dimensional convolution array based on a convolution operation performed for selected points rather than for all points within a D-dimensional input array. The selectivity obtained according to the embodiments of the invention exploit the spatial locality associated with the convolution operations and spatial locality within the selected points. By transiently saving previously determined partial convolutions for potential reuse in subsequent computations of the D-dimensional convolution operations at other points.

The present specification further describes a specialized convolution cache to exploit the spatial locality with negligible overhead. The cache allows reuse of previously computed partial convolution values, thus increasing performance and decreasing power and memory requirements. This may be achieved without needing to compute convolutions at all points within a multi-dimensional array.

The present specification also describes easy segmentation of an input array among different processors prior to being convoluted. Each processor independently convolutes an associated sub-array. Moreover, the convolution is a highly data-parallel operation, which makes it amenable to vectorization processing.

The present specification further describes a novel memory management scheme that is applicable to multi-core processors that rely on software memory management (such as the Cell BE processor). In particular, the memory management may involve quad-buffers that allow for overlapped computation and memory access operation, without requiring large buffer sizes.

Figure 8:
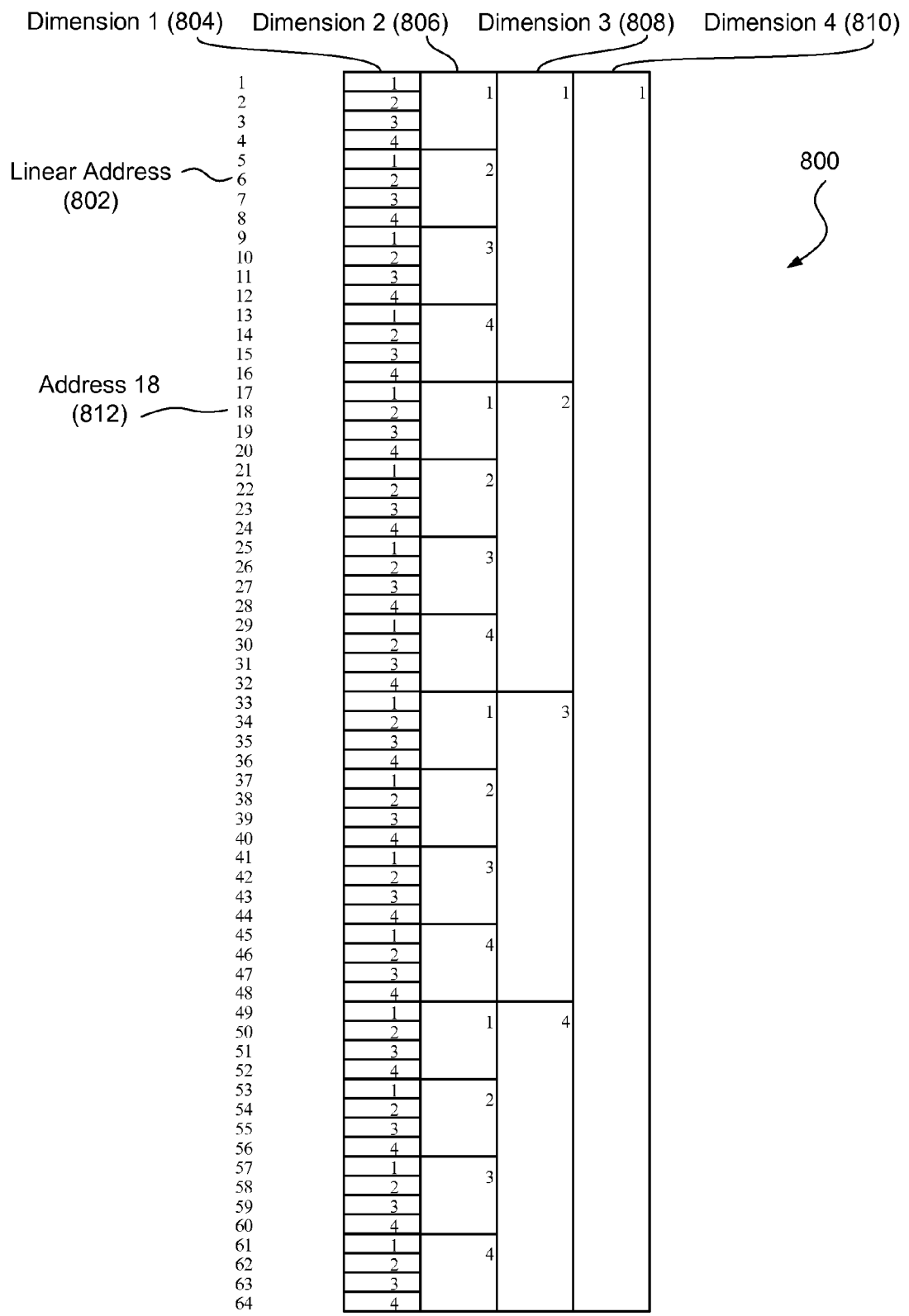
FIG. 8 is an example illustrating mapping of a multi-dimension address space into a one (linear) dimensional address space.
Figure 9:
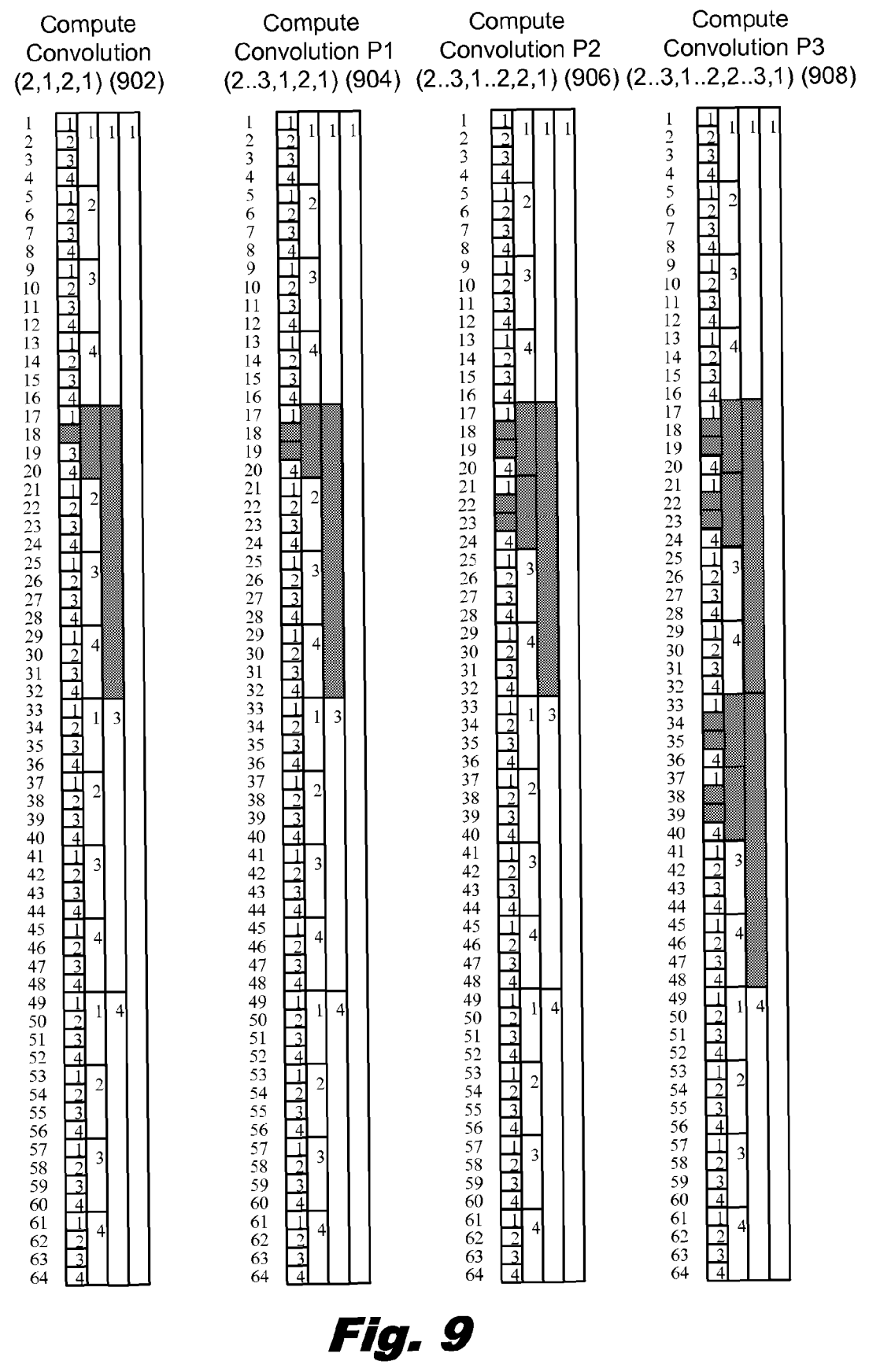
Figure 10:
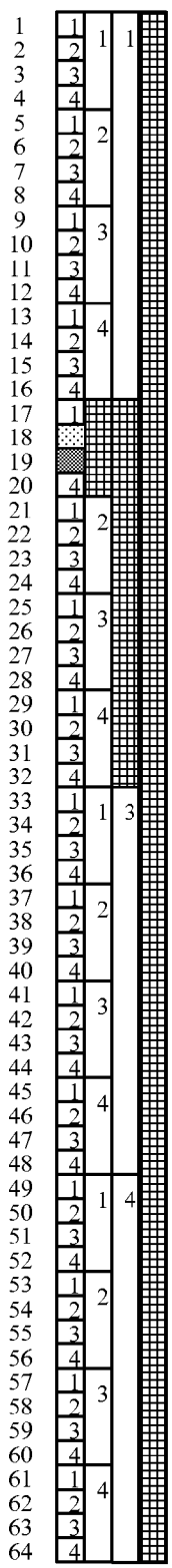
FIG. 10 is an exemplary diagram illustrating partial convolutions steps for computing convolution at the next adjacent point, according to the example of FIG. 8.
Figure 10:
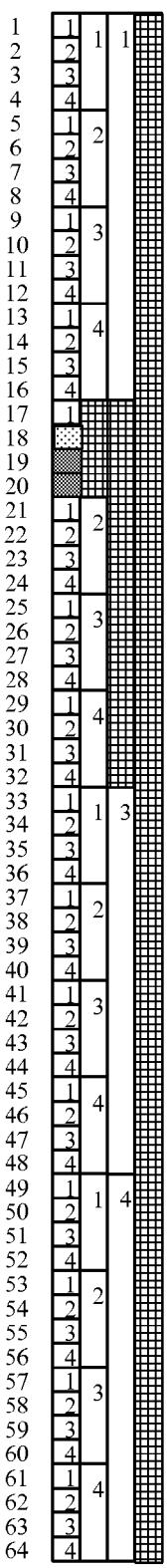
Figure 10:
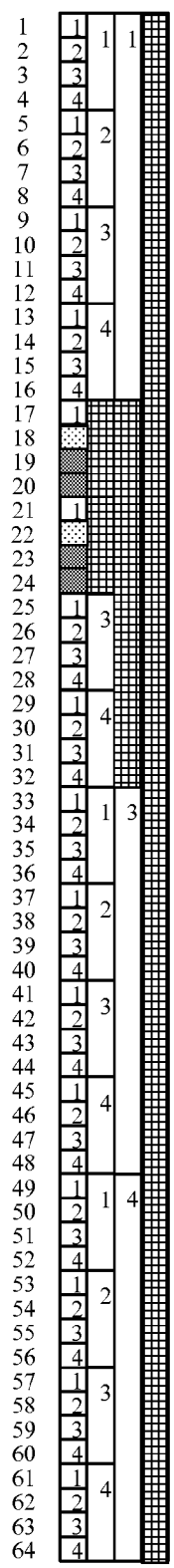
Figure 10:
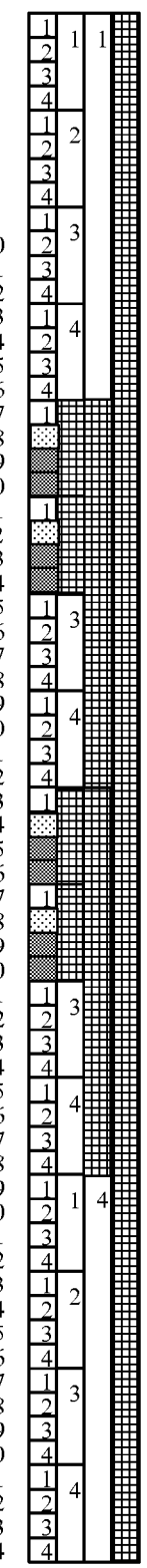

FIGS. 8-10 illustrate an exemplary application of the invention for performing a multi-dimensional convolution in four processors. The input array is a four dimensional input array with dimensional sizes of $a_1=4$, $a_2=4$, $a_3=4$, $a_4=16$, and a kernel size of 2. The input array is stored linearly in main memory. The storage mapping (from multi-dimensional space into linear space) is illustrated in FIG. 9.

Referring to FIG. 8, the numbers on the left represent the linear positions (or addresses) (802) of each element of the input array. The right table shows the corresponding coordinate values for each dimension (804, 806, 808, 810). For example the linear address 18 (812) corresponds to coordinates (2,1,2,1). The application of the equation for computing the linear address from point coordinates gives in the present example: 2+0*4+1*4*4+0*4*4*4=18. As will be appreciated by one skilled in the relevant art, the equation described above may be used to describe any arbitrary number of dimensions.

According to certain embodiments, the input array may be divided into four processors as follows: processor 1 is allocated the sub-array with points 1 . . . 4, 1 . . . 4, 1 . . . 4, 1 . . . 5; processor 2 is allocated the sub-array with points 1 . . . 4, 1 . . . 4, 1 . . . 4, 5 . . . 9; processor 3 is allocated the sub-array with points 1 . . . 4, 1 . . . 4, 1 . . . 4, 9 . . . 13; processor 4 is allocated the sub-array with points 1 . . . 4, 1 . . . 4, 1 . . . 4, 13 . . . 16.

FIG. 9 shows the overlap across the last dimension. Each processor may therefore compute convolutions on 4×4×4×4 hypercubes. For example, processor 1 computes convolutions among selected points from 1 . . . 4, 1 . . . 4, 1 . . . 4, 1 . . . 4; processor 2 computes convolutions among selected points from 1 . . . 4, 1 . . . 4, 1 . . . 4, 5 . . . 8; processor 3 computes convolutions among selected points from 1 . . . 4, 1 . . . 4, 1 . . . 4, 9 . . . 12; and processor 4 computes convolutions among selected points from 1 . . . 4, 1 . . . 4, 1 . . . 4, 13 . . . 16.

The entries computed for the partial convolutions P3 (908), P2 (906), P1 (904), and the full convolution (902) are shown on in FIG. 9. The cached regions are also highlighted.

As the operation performed by each processor is similar, the following description will only describe the operation performed by processor 1. The input array may be read into local storage chunk frames. The chunk size equal 85 as determined by Exhibit E5.1. The linear scan corresponds to a sequential scan from linear address 1 to the last address of the array (address 128, not shown in the Figure). It is here supposed that the first point at which the convolution is to be computed is the point with linear address 18. The left table at FIG. 10 shows the output array generated from the first convolution. It highlights the linear address and the corresponding coordinates. The chunk number corresponding to address 18 is zero. Accordingly, chunk zero is loaded into local memory, and chunk one is pre-fetched. The previous chunk does not exist and is not loaded.

To compute convolution at a given point, a sequence of one dimensional partial convolutions are required. P3 (908) is first computed according to Exhibit E5.2. More specifically, P3 (908) is computed at points such that $j_1$ varies from 2 to 3, $j_2$ varies from 1 to 2, and $j_3$ varies from 2 to 3.

While computing P3 (908), the input array is read at location (2, 2, 2, 2), that triggers loading chunk 1 into frame 1. All points that are larger may be accessed from chunk 1. No overflow should happen as the chunk size is equal to the size of all points accessed. The computed P3 values are stored in the cache associated with this step.

Then P2 (906) is computed according to Exhibit E5.3. P2 is computed at points such that $j_1$ varies from 2 to 3, $j_2$ varies from 1 to 2. While computing P2 (906), the values for P3 may be obtained from the P3 (908) cache.

Then P1 (904) is computed according to Exhibit E5.4. P1 (904) is computed at points such that $j_1$ is varied from 2 to 3. While computing P1 (904), values for P2 (906) are read from P2 (902) cache. The final convolution (902) at point (2,1,2,1) may then be computed according to Exhibit E5.5.

To compute convolution at the next adjacent point having a linear position 19 and coordinates (3,1,2,1), similar steps are performed but with the x coordinates shifted by one, as shown in FIG. 10. FIG. 10 shows the overlap between previous computations of the partial convolutions for current and old points. This illustrates the reuse in computed data. These data are cached. The cache holds all values from the point after the arrow up to the last point. The cache size at dimension i is determined according to Exhibit E3 where H is set to i-1.

Considering the minimum and maximum points accessed during computation of a partial convolution, their linear position difference can be computed to illustrate that they are equal to the cache size parameter. If the minimum point is $(m_1, m_2, \ldots, m_D)$, the maximum point will be $(m_1+n_1-1, m_2+n_2-1, \ldots, m_D+m_{(D-1)})$. The linear address L_min of the minimum point and the linear address L_max of the maximum point are determined as follows:

$$L\_min = m_1 + (m_2-1)*a_1 + (m_3-1)*a_1*a_2 + \ldots + (m_{D-1})*a_1*a_2*\ldots*a_{D-1}$$

$$L\_max = m_1 + n_1 - 1 + (m_2+n_{2\text{-}1}-1)*a_1 + (m_3+n_{3\text{-}1}-1)*a_1*a_2*a_3 + \ldots + (m_D+n_{D\text{-}1}-1)*a_1*a_2*a_3*\ldots*a_{D-1}$$

Accordingly, the difference L_max−Lmin between the linear address L_max of the maximum point and the linear address L_min of the minimum point is as follows:

$$L\_max - L\min = (n_1-1) + (n_2-1)*a_1 + (n_3-1)*a_1*a_2 + \ldots + (n_D-1)*a_1*a_2*a_3*\ldots*a_{D-1}$$

The difference L_max−Lmin between the linear address L_max of the maximum point and the linear address L_min of the minimum point is therefore equal to the cache size defined by equation E3 where H is set to D-1.

Figure 11:
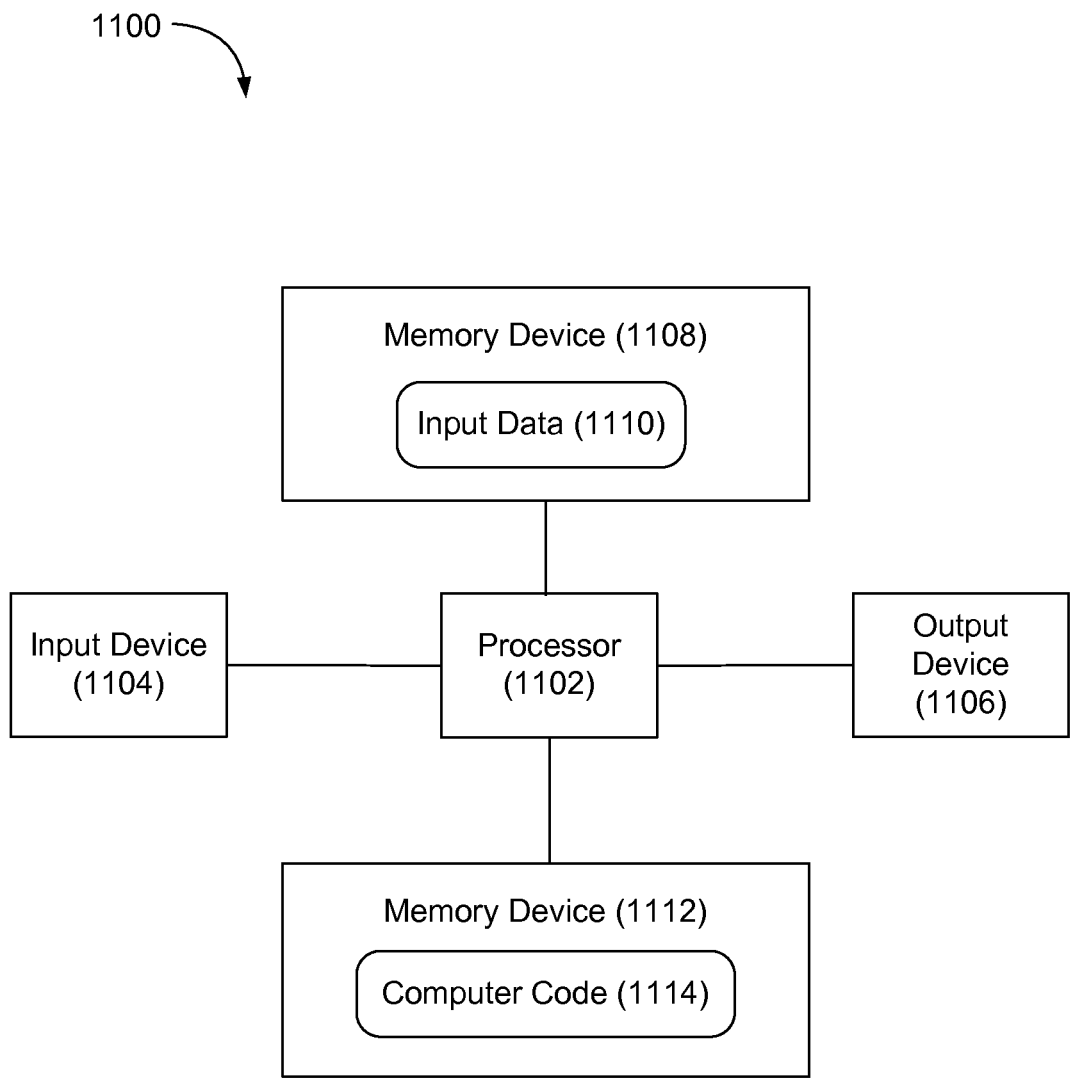
FIG. 11 illustrates a computer system used for performing a multi-dimensional convolution, according to one illustrative embodiment of principles described herein.

FIG. 11 is a diagram showing an illustrative computer system (1100) which may be used to selectively transform a multi-dimensional array. According to certain illustrative embodiments, the computer system (1100) may include a processor (1102), an input device (1104) coupled to the processor (1102), an output device (1106) coupled to the processor (1102), and memory devices (1108, 1112) each coupled to the processor (1102).

The processor (1102) may be a processing unit such as a central processing unit (CPU). The input device (1104) may be a number of devices including, but not limited to, a keyboard, a mouse, and a touchpad. The output device (1106) may be a number of devices including, but not limited to, a printer, a plotter, a display device (e.g., a computer screen), a magnetic tape, a removable hard disk, and an optical disc.

The memory devices (1108, 1112) may be a number of devices, including but not limited to a hard disk, a floppy disk, a magnetic tape, an optical storage such as a compact disc (CD) or a digital video disc (DVD), a dynamic random access memory (DRAM), a read-only memory (ROM), and a solid state drive. The memory device (1112) may include a computer code (1114) which is a computer program that comprises computer-executable instructions. The computer code (1114) may include an algorithm for selectively transforming multi-dimensional array. The processor (1102) may be used to execute the computer code (1114). The memory device (1108) may include input data (1110). The input data (1110) may include any input required by the computer code (1114).

The output device (1106) may display output as indicated by the computer code (1114). Either or both memory devices (1108, 1112) (or one or more additional memory devices not shown in FIG. 11) may be used as a computer usable storage medium (or program storage device) having a computer readable program embodied therein and/or having other data stored therein, wherein the computer readable program comprises the computer code (1114).

Generally, a computer program product (or, alternatively, an article of manufacture) of the computer system (1100) may comprise said computer usable storage medium (or said program storage device). While FIG. 11 shows the computer system (1100) as a particular configuration of hardware and software, any configuration of hardware and software, as would be known to a person of ordinary skill in the art, may be utilized for the purposes stated supra in conjunction with the particular computer system (1100). For example, the memory devices (1108, 1112) may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

EXHIBITS

In the Exhibits, the sign "$\lceil \ \rceil$" refers to ceiling operation.

Exhibit E1

$$Conv(u_1, u_2, \ldots, u_D) = \quad (1)$$

$$\sum_{i_1=1}^{n_1} \sum_{i_2=1}^{n_2} \ldots \sum_{i_D=1}^{n_D} f\left(u_1 - \left\lceil \frac{n_1}{2} \right\rceil + i_1, u_2 - \left\lceil \frac{n_2}{2} \right\rceil + i_2, \ldots, u_D - \left\lceil \frac{n_D}{2} \right\rceil + i_D\right) \cdot k(i_1, i_2, \ldots, i_D)$$

$$k(i_1, i_2, \ldots, i_D) = k_1(i_1)k_2(i_2) \ldots k_D(i_D) \quad (2)$$

$$Conv(u_1, u_2, \ldots, u_D) = \quad (3)$$

$$\sum_{i_1=1}^{n_1} k_1(i_1) \sum_{i_2=1}^{n_2} k_2(i_2) \ldots \sum_{i_D=1}^{n_D} f\left(u_1 - \left\lceil \frac{n_1}{2} \right\rceil + i_1, u_2 - \left\lceil \frac{n_2}{2} \right\rceil + i_2, \ldots, u_D - \left\lceil \frac{n_D}{2} \right\rceil + i_D\right) \cdot k_D(i_D)$$

Exhibit E2

E2.1 (1)

$$p_{D-1}(j_1, j_2, \ldots, j_{D-1}, u_D) = \sum_{i_D=1}^{n_D} k_D(i_D) f_D\left(j_1, j_2, \ldots, j_{D-1}, u_D - \left\lceil \frac{n_D}{2} \right\rceil + i_D\right)$$

$$p_{D-2}(j_1, j_2, \ldots, j_{D-2}, u_{D-1}, u_D) = \sum_{i_{D-1}=1}^{n_{D-1}} k_{D-1}(i_{D-1}) \quad (2)$$

$$p_{D-1}\left(j_1, j_2, \ldots, j_{D-1}, u_{D-1} - \left\lceil \frac{n_{D-1}}{2} \right\rceil + i_{D-1}, u_D\right)$$

$$\ldots$$

$$p_{D-m}(j_1, j_2, \ldots, j_{D-m}, u_{D-m+1}, \ldots, u_D) = \quad (m)$$

$$\sum_{i_{D-m+1}=1}^{n_{D-m+1}} k_{D-m+1}(i_{D-m+1}) p_{D-m+1}\left(j_1, j_2, \ldots, j_{D-m}, u_{D-m+1} - \left\lceil \frac{n_{D-m+1}}{2} \right\rceil + i_{D-m+1}, u_{D-m+2}, \ldots, u_D\right)$$

$$\ldots$$

$$p_2(j_1, j_2, u_3 \ldots, u_D) = \quad (D-1)$$

$$\sum_{i_3=1}^{n_3} k_3(i_3) p_3\left(j_1, j_2, u_3 - \left\lceil \frac{n_3}{2} \right\rceil + i_3, u_4, \ldots, u_D\right)$$

$$p_1(j_1, u_2 \ldots, u_D) = \sum_{i_2=1}^{n_2} k_2(i_2) p_2\left(j_1, u_2 - \left\lceil \frac{n_2}{2} \right\rceil + i_2, u_3, \ldots, u_D\right) \quad (D)$$

-continued

E2.2

$$Conv(u_1, u_2, \ldots, u_D) = \sum_{i_1=1}^{n_1} k_1(i_1)p_1\left(u_1 - \left\lceil\frac{n_1}{2}\right\rceil + i_1, u_2\ldots, u_D\right)$$

Exhibit E3

$$\sum_{j=1}^{H}(n_j - 1)\prod_{k=0}^{j-1} a_k$$

where $a_0 = 1$, $ak$ is the size of dimension $k$, and $H$ is the upperbound on summation determined by use context.

Exhibit E4

L_POS = floor(L/chunk_size)

Exhibit E5

E5.1
$(1 + 4 + 4*4 + 4*4*4) = 85$

E5.2

$$p_3(j_1, j_2, j_3, 1) = \sum_{i_4=1}^{2} k_4(i_4)f\left(j_1, j_2, j_3, 1 - \left\lceil\frac{2}{2}\right\rceil + i_4\right)$$

E5.3

$$p_2(j_1, j_2, 2, 1) = \sum_{i_3=1}^{2} k_3(i_3)p_3\left(j_1, j_2, 2 - \left\lceil\frac{2}{2}\right\rceil + i_3, 1\right)$$

E5.4

$$p_1(j_1, 1, 2, 1) = \sum_{i_2=1}^{2} k_2(i_2)p_2\left(j_1, 1 - \left\lceil\frac{2}{2}\right\rceil + i_2, 2, 1\right)$$

E5.5

$$CONV(21, 2, 1) = \sum_{i_1=1}^{2} k_1(i_1)p_1\left(2 - \left\lceil\frac{2}{2}\right\rceil + i_1, 1, 2, 1\right)$$

What is claimed is:

1. A method for selectively transforming a multi-dimensional input array comprising D dimensions, said method comprising:
   segmenting said input array into a number of sub-arrays with a computing system;
   determining a D-dimensional convolution of said input array at only selected points in each said sub-array, said convolution being a function of a product of D one-dimensional kernels;
   determining partial convolutions at each dimension iteratively, an iterative determination of one of said partial convolutions being determined, in part, from a previous iterative determination;
   collecting transformed sub-array values to form a transformed input array; and
   storing said transformed input array.

2. The method of claim 1, wherein each said partial convolution is determined at points $(j_1, j_2, \ldots, j_i, u_{i+1}, \ldots, u_D)$ where point $j_p$ varies from $u_p$-ceiling$(n_p/2)+1$ to $u_p$-ceiling $(n_p/2)+n_p$, and $n_p$ represents the length of a one dimension kernel.

3. The method of claim 1, wherein determining a D-dimensional convolution of said input array at only selected points in each said sub-array further comprises processing said selected points of each sub-array in a linear scan order.

4. The method of claim 1, wherein determining a D-dimensional convolution of said input array at only selected points in each said sub-array further comprises storing values for each partial convolution in an associated convolution cache.

5. The method of claim 4, wherein said associated convolution cache comprises a tag array and a data array, said data array having said partial convolution values stored therein, each cache line of said convolution cache comprising a tag value associated with a data value of said data array.

6. The method claim 5, wherein determining partial convolutions at each dimension iteratively further comprises previously determining a cache access status.

7. The method of claim 6, wherein determining said cache access status comprises:
   determining a linear position of said given point from a coordinate set of said given point;
   converting said linear position to a line position in said cache; and
   comparing said tag value corresponding to said line position with said linear position of said given point.

8. The method of claim 7, wherein said cache access status is set to "hit" if said tag value corresponding to said line position matches said linear position of said given point, and said cache access status is set to "miss" if said tag value corresponding to said line position does not match said linear position of said given point.

9. The method of claim 8, wherein determining partial convolutions at each dimension iteratively further comprises retrieving the partial convolution value from the cache and processing a next point in said sub-array if said cache access status is set to "hit."

10. The method claim 8, wherein determining partial convolutions at each dimension iteratively further comprises computing said partial convolution at said given point if said cache access status is set to "miss."

11. The method of claim 10, wherein computing said partial convolution at said given point comprises accessing a cache associated with a previously computed partial convolution.

12. The method of claim 1, wherein segmenting said input array into a number of sub-arrays comprises:
   dividing said input array into chunks of data;
   labelling said chunks linearly; and
   allocating chunk frames in a processor cache for each chunk.

13. The method of claim 12, wherein determining partial convolutions at each dimension iteratively comprises accessing chunk frames using said linear position of said given point.

14. A computing system for selectively transforming a multi-dimensional input array comprising D dimensions, the system comprising:
   a memory; and
   a processor, said processor comprising a cache;
   in which said processor is configured to:
      segment said input array into a number of sub-arrays with a computing system;
      determine a D-dimensional convolution of said input array at only selected points in each said sub-array, said convolution being a function of a product of D one-dimensional kernels;
      determine partial convolutions at each dimension iteratively, an iterative determination of one of said partial convolutions being determined, in part, from a previous iterative determination;
      collect transformed sub-array values to form a transformed input array; and
      store said transformed input array.

15. The system of claim 14, wherein to determine a D-dimensional convolution of said input array at only selected points in each said sub-array, said processor is further configured to process said points of each sub-array in a linear scan order.

16. The system of claim 14, wherein to determine a D-dimensional convolution of said input array at only selected points in each said sub-array, said processor is further configured to store values for each partial convolution in an associated convolution cache.

17. The system of claim 16, wherein said associated convolution cache comprises a tag array and a data array, said data array having said partial convolution values stored therein, each cache line of said convolution cache comprising a tag value associated with a data value of said data array.

18. The system of claim 17, wherein to determine partial convolutions at each dimension iteratively, said processor is further configured to previously determine a cache access status.

19. The system of claim 18, wherein to determine said cache access status, said processor is further configured to:
   determine a linear position of said given point from a coordinate set of said point;
   convert said linear position to a line position in said cache; and
   compare said tag value corresponding to said line position with said linear position of said given point.

20. A computer program product for selectively transforming a multi-dimensional input array comprising D dimensions, said computer program product comprising:
   a computer readable storage medium having computer readable code embodied therewith, said computer readable program code comprising:
      computer readable program code configured to segment said input array into a number of sub-arrays with a computing system;
      computer readable program code configured to determine a D-dimensional convolution of said input array at only selected points in each said sub-array, said convolution being a function of a product of D one-dimensional kernels;
      computer readable program code configured to determine partial convolutions at each dimension iteratively, an iterative determination of one of said partial convolutions being determined, in part, from a previous iterative determination;
      computer readable program code configured to collect transformed sub-array values to form a transformed input array; and
      computer readable program code configured to store said transformed input array.

* * * * *